May 2, 1967 J. F. DE RIDDER, JR 3,317,666

PRESSURE-OPERATED VALVE FOR A PROJECTION SYSTEM

Filed April 14, 1964

INVENTOR:
JOHN F. DE RIDDER, JR.

BY [signature]
HIS ATTORNEY.

United States Patent Office 3,317,666

Patented May 2, 1967

3,317,666

PRESSURE-OPERATED VALVE FOR A PROJECTION SYSTEM

John F. De Ridder, Jr., Huntsville, Ala., assignor to General Electric Company, a corporation of New York Filed Apr. 14, 1964, Ser. No. 359,641
6 Claims. (Cl. 178—7.87)

The present invention relates to a system of projecting light as a function of the parameters of a defraction grating in a light modulating medium and more particularly to a pressure-operated valve for minimizing contamination of the light modulating medium.

A projection system which is capable of producing a viewable image that is a function of applied or received electrical signals is disclosed in Patent No. 3,063,331, issued Nov. 13, 1962, to W. E. Glenn, Jr., and is assigned to the assignee of the present invention. Such a projection system is generally suitable for use in projecting a television image and includes an evacuated enclosure or casing which encloses a rotatable, transparent disc on which there is a film of a deformable light modulating medium. Included in such a projection system are one or a plurality of electron guns suitably mounted on the enclosure and are directed inwardly. The electron guns emit electron beams which are selectively scanned or deflected across a portion of the light modulating medium. The electron beams deform the surface of the light modulating medium. The deformations formed in the light modulating medium constitute defraction gratings which, in conjunction with a light source and a Schlieren optical system, serve to selectively control the passage of light from the light source to a screen.

In such a projection system it is important that the light modulating medium be free from contamination which might otherwise create unwanted distortions in the medium, thereby creating imperfections in the defraction gratings. Contamination of the light modulating medium may occur when the electron guns are replaced at which time the vacuum in the enclosure is temporarily destroyed. Dust particles or other foreign contaminants which enter the enclosure may be electrostatically attracted to the light modulating medium before the gun can be replaced and the vacuum restored. If such contamination occurs, it may impair performance and generally require the replacement of the contaminated medium at time intervals more frequent than in normal use.

The present invention provides means for obviating the necessity of changing the light modulating medium to maintain an uncontaminated medium within the projection system.

Accordingly, an object of this invention is to provide means for preventing foreign contaminants from entering and contaminating a light modulating medium in a projection system.

Another object of the present invention is to provide a pressure-operated valve which protects the light modulating medium from contamination and obviates frequent medium replacement.

Still another object of the present invention is to provide a pressure-operated valve having a shutter mechanism which is responsive to pressure increase attendant to vacuum destruction.

Still another object is to provide a pressure-operated valve mechanism including a bellows arrangement which actuates a shutter mechanism to a closed or open position when subjected to pressure variations.

These and other objects are achieved in a preferred embodiment of the present invention wherein a valve mechanism having a pivotable shutter for covering or uncovering apertures within a cover through which electron beams are projected onto a rotatable, transparent disc bearing a film of a light modulating medium is employed. A pressure-responsive bellows actuates the pivotable shutter when the vacuum within the enclosure is destroyed and the pressure increases, thereby covering the apertures and automatically shielding the light modulating medium from dust particles or other contaminants. Upon restoration of the vacuum, the shutter is automatically rotated back to an open position in response to movement of the flexible bellows.

The novel features believed to be characteristic of the present invention are set forth with particularity in the appended claims. The invention, itself, however, together with further objects and advantages thereof, may best be understood by reference to the following description taken in connection with the accompanying drawings in which:

Figures 1, 2, 3:
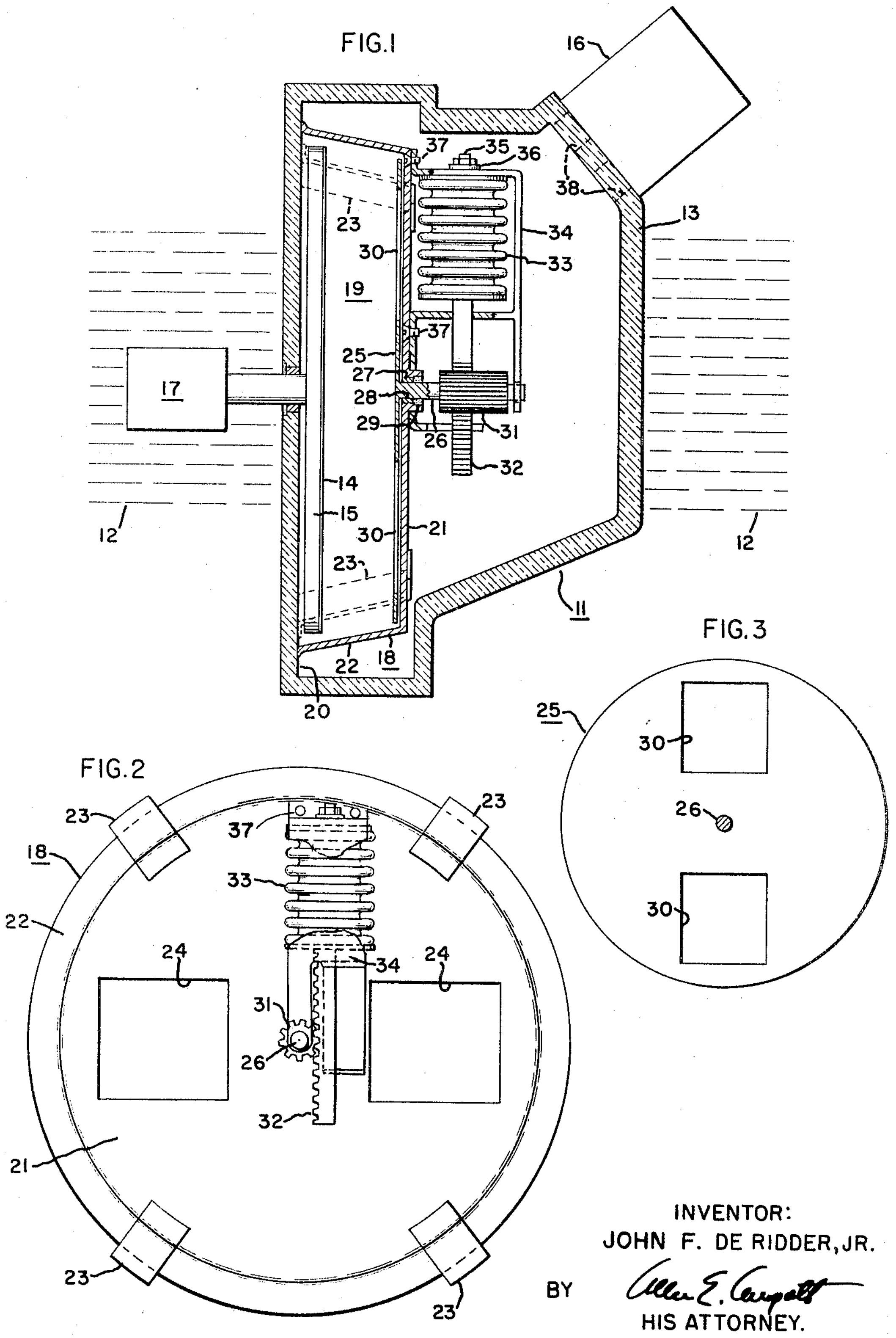
FIGURE 1 is a side view of the apparatus incorporating one embodiment of the invention.
FIGURE 2 is an end view of the apparatus of FIGURE 1 showing the pressure-operated valve including the shutter, actuating bellows and cover.
FIGURE 3 is an end view of the shutter.

In the embodiment of FIGURE 1, there is shown a portion of a projection system 11 similar to that disclosed in Patent No. 3,063,331 mentioned hereinbefore. This portion of the projection system hereinafter referred to as a light valve is illustrated as being in the path of light rays 12 between a source of light and a screen (not shown). The casing 13 of the light valve has portions thereof constructed of transparent material to allow passage of light through the casing structure between the light source and the screen. During passage through the casing 13, the light rays 12 are modulated by irregularities in a film of a light modulating medium 14, which covers a rotatable, transparent disc 15 disposed within the casing 13. The light modulating medium 14 is a transparent, deformable substance such as, for example, one of those described in Patent 2,943,147 assigned to the assignee of the present invention.

The depression deformations in the light modulating medium 14 are created by electron beams emitted from a single or a pair of electron guns 16 mounted on the casing 13, and directed inwardly through apertures 38 in the casing wall. The depths of the depression deformations depend upon the charge densities. These deformations are referred to as a defraction grating and operate as a means for selectively modulating the light rays passing between the light source and the screen. Disc 15 is rotated by rotating means 17, for example, through gears by a motor at a prescribed rate of speed. Although the rotating means 17 are shown in FIGURE 1, they form no part of the present invention.

To eliminate any unwanted distortion in the defraction grating and to insure that the only deformations in the light modulating medium 14 are those created by the electron guns 16, it is imperative that the modulating medium 14 be free of contamination in the form of dust particles or other foreign material. By evacuating the casing 13, the possibility of contamination is considerably decreased. However, there are times when the vacuum may be intentionally destroyed as, for example, when the electron guns 16 are replaced and the apertures 38 in the casing 13 through which the electron beams of the guns are directed, allow air to enter and destroy the vacuum within the casing 13. If no means are provided for protecting the light modulating medium 14 on the disc 15 when the vacuum is destroyed, dust or other foreign matter entering with the air may contaminate the medium and cause a decrease in the performance quality due to the unwanted defractions unless the contaminated medium is replaced with uncontaminated medium.

The present invention employs the use of a dish-shaped cover 18 which cooperates with an interior wall 20 of the casing 13 to form a contamination-free compartment 19 for the disc 15 and light modulating medium 14. The cover construction consists of a cover face 21 and an annular cover side wall 22 which presents a dish-shaped appearance. The cover 18 is maintained against the interior casing wall 20 by a plurality of cover clamps 23 which are secured to the casing wall 20 and which engage the cover face 21. The cover 18 includes a pair of apertures 24 (see FIGURE 2) through which electron beams from the electron guns 16 may pass for creating a defraction pattern in the light modulating medium 14 disposed on disc 15 within the contamination-free compartment 19. Only a single aperture is required if only one gun is employed. The apertures 24 within the cover 18 are normally maintained uncovered to allow passage of the electron beams into the contamination-free chamber during normal operation.

When the electron guns 16 are replaced and the vacuum within the casing 13 is destroyed, it is necessary to cover the apertures 24 in order to preserve the contamination-free environment within the compartment 19. A pivotable shutter 25 (see FIGURE 3) is employed to cover the apertures 24 in cover 21 under these circumstances. The shutter 25 is mounted on a shutter-actuating shaft 26 which is pivotable on a bearing 27 within a shaft-receiving aperture 28 in the cover face 21. Shutter 25 is maintained in intimate contact with the inner surface of cover face 21. A seal 29 is disposed along the shutter-actuating shaft 26 adjacent the bearing 27 to insure that contaminating particles do not enter the compartment 19 along the shaft 26.

Shutter 25 is more clearly illustrated in FIGURE 3. The shutter 25 has a pair of shutter apertures 30 disposed therein and, when the shutter apertures 30 are not aligned with the dust cover apertures 24, the shutter 25 operates to cover the dust cover apertures 24. Conversely, when the shutter 25 is pivoted to align the shutter apertures 30 with the dust cover apertures 24, the electron beams may pass through the cover unimpeded.

The pivoting means for shutter 25 are illustrated in FIGURES 1 and 2 and include a pinion gear 31 attached to the shutter-actuating shaft 26. The pinion gear 31 engages a rack gear 32 and is rotated in response to the translation movement of the rack gear 32. The rack gear 32 is attached to the free end of a flexible bellows 33 which expands and contracts in response to the pressure within the casing 13. A mounting bracket 34 is attached to the opposite end of the bellows 33 by a nut 36 and a bolt 35 which is integral with the bellows. The mounting bracket 34 is secured to the cover face 21 by a plurality of flat-headed screws 37. The interior portion of the bellows 33 is hermetically sealed at approximately atmospheric pressure with a pressurized fluid, such as air therein.

When a vacuum is established within the casing 13, the pressure within the bellows 33 causes the bellows to expand and to advance the rack gear downwardly and, consequently, to rotate the pinion gear 31. By rotating the pinion gear, the shutter 25 is rotated to align the shutter apertures 30 with the cover apertures 24, thus uncovering the cover aperture 24. When the vacuum is destroyed and the pressure within the casing 13 increases, the bellows 33 contracts and rotates the shutter 25 through the rack gear 32 and pinion gear 31. The shutter apertures 30 are consequently rotated out of alignment with the dust cover apertures 24 and the shutter operates to cover the apertures in cover 21, thus, sealing the contamination-free compartment 19.

While not shown in the drawings, it will be obvious to those skilled in the art that means such as adjustment screws may be employed in conjunction with bracket 34 and a tab mounted on the end of rack gear 32 for limiting the travel of the bellows which in turn limits the travel of shutter 25 to exact alignment of the apertures 24 during closed position.

By employing a pressure-operated valve between the electron gun and the chamber in which the light modulating medium is placed, the defraction producing medium is maintained free of contamination for longer operating periods than heretofore achieved. While the invention has been described with respect to certain specific embodiments, it will be appreciated that many modifications and changes may be made by those skilled in the art without departing from the spirit of the invention. It is not desired that the invention be limited to the particular embodiment shown and described and it is intended by the attendant claims to cover all modifications within the spirit and scope of this invention.

What I claim as new and desire to secure by Letters Patent of the United States is:

1. In a light valve positioned between a light source and a screen for projection of an image on the screen:
   (a) means defining a vacuum chamber,
   (b) diffraction grating producing means in said chamber through which light from said source passes before projection on said screen,
   (c) a cover for protecting said last-mentioned means from contaminating particles, said cover having at least one aperture therein,
   (d) a shutter movable between a first position for covering said aperture and a second position for uncovering said aperture, and
   (e) pressure-responsive means in said chamber to actuate said shutter to cover said aperture in response to increasing pressure in said chamber, and to uncover said aperture in response to decreasing pressure in said chamber.

2. In a light valve positioned between a light source and a screen for projection of an image on the screen:
   (a) means defining a vacuum chamber,
   (b) a disc in said chamber, and a light modulating fluid film on said disc for producing a diffraction grating through which light from said source passes before projection on said screen,
   (c) a cover for protecting said light modulating fluid film from contaminating particles, said cover having at least one aperture therein,
   (d) a shutter movable between a first position for covering said aperture and a second position for uncovering said aperture, and
   (e) pressure-responsive means in said chamber to actuate said shutter to cover said aperture in response to increasing pressure in said chamber, and to uncover said aperture in response to decreasing pressure in said chamber.

3. In a light valve positioned between a light source and a screen for projection of an image on the screen:
   (a) means defining a vacuum chamber,
   (b) a disc disposed within said chamber adjacent one wall of said chamber, and a light modulating fluid film on said disc through which light from said source passes before projection on said screen,
   (c) a dish-shaped cover for protecting said disc and fluid film from contaminating particles, said dish-shaped cover having at least one aperture in the face thereof,
   (d) clamp means for securing said cover to said chamber wall adjacent said disc for providing a contamination-free compartment for said disc,
   (e) a rotatable disc-shaped shutter adjacent the face of said cover, said shutter having at least one aperture therein, and
   (f) pressure-responsive means for rotating said shutter to move said shutter aperture into and out of alignment with said cover aperture for uncovering and covering said cover aperture in response to pressure variations within said vacuum chamber.

4. The apparatus as defined in claim 3 wherein said means to actuate said shutter comprises:
(a) a shaft attached to said shutter for rotating said shutter to cover and uncover said cover aperture;
(b) a bellows mounted on said dust cover, and
(c) means connecting said bellows and said shaft for rotating said shaft in response to expansion and contraction of said bellows.

5. The apparatus as defined in claim 3 wherein said means to actuate said shutter comprises:
(a) a shaft attached to said shutter for rotating said shutter to cover and uncover said cover aperture,
(b) a pinion gear attached to said shaft and a rack gear for rotating said pinion in response to translation of said rack gear,
(c) a bellows having a first end attached to said rack gear, and
(d) a stationary mounting bracket for supporting a second end of said bellows whereby expansion of said bellows causes said rack to translate and rotate said pinion and said shutter to cover and uncover said cover aperture.

6. In a light valve positioned between a light source and a screen for projection of an image on the screen:
(a) means defining a vacuum chamber,
(b) a disc disposed within said chamber and a light modulating fluid film on said disc through which light from said source passes before projection on said screen,
(c) a pair of electron guns attached to the wall of said vacuum chamber for directing a pair of electron beams on said light modulating fluid, (d) a cover protecting said disc and light modulating fluid film from foreign particles entering said chamber upon destruction of said vacuum when replacing said electron guns, said cover having a pair of apertures therein through which said electron beams may pass,
(e) a rotatable shutter for covering and uncovering said apertures, said shutter being mounted on a shaft for rotation with said shaft,
(f) a pinion gear attached to said shaft, and a rack gear for rotating said pinion gear upon translation of said rack gear,
(g) a bellows having a first end attached to said rack gear and a second end attached to a stationary mounting bracket, and
(h) said bellows expanding in response to pressure reduction in said chamber to cause said rack and pinion gears to rotate said shutter for automatically uncovering said cover apertures, said bellows contracting in response to increase in pressure in said chamber to cause said rack and pinion gears to rotate said shutter for automatically covering said cover apertures when said electron guns are being replaced.

References Cited by the Examiner

UNITED STATES PATENTS 3,255,371 6/1966 Romano ............ 178—7.5

DAVID G. REDINBAUGH, *Primary Examiner.*

J. A. ORSINO, *Assistant Examiner.*